Figure 1:
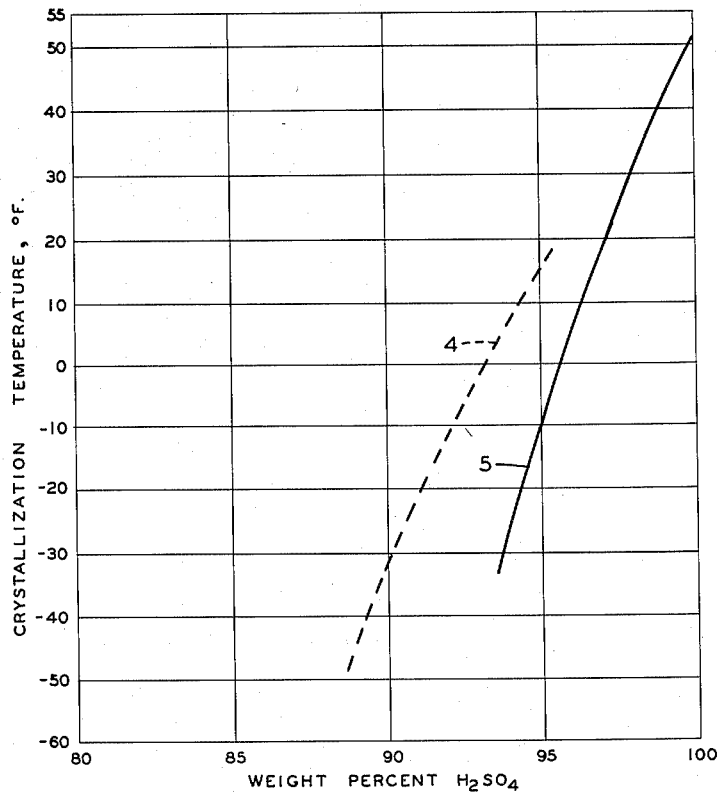

Aug. 30, 1955   J. F. SKELLY ET AL   2,716,592

METHOD OF PURIFYING SULFURIC ACID

Filed Sept. 23, 1952

INVENTORS
SAMUEL R. STILES
JOSEPH F. SKELLY
BY  D. H. Palmer
T. C. Virgil
ATTORNEYS

United States Patent Office 2,716,592
Patented Aug. 30, 1955

2,716,592

METHOD OF PURIFYING SULFURIC ACID

Joseph F. Skelly, New York, N. Y., and Samuel R. Stiles, Cresskill, N. J., assignors to The M. W. Kellogg Company, Jersey City, N. J., a corporation of Delaware Application September 23, 1952, Serial No. 310,974

16 Claims. (Cl. 23—172)

The present invention relates to novel methods of purifying sulfuric acid, and more particularly pertains to purifying sulfuric acid by fractional crystallization.

At present, sulfuric acid is used extensively for various purposes, such as refining of lubricating oils, alkylation of hydrocarbons, dehydrating wet materials, etc. Usually, the acid becomes contaminated with materials of the particular process in which it is used, and in order to restore its purity and/or strength, the acid is subjected to a purification treatment. For example, with respect to the case of alkylating hydrocarbons with sulfuric acid as a catalyst, the acid strength should be maintained at a high level and the acid should be reasonably free of certain impurities, otherwise the quality of the alkylate product is seriously affected. Prior to our invention, it was the practice to purify sulfuric acid by one of two methods. The first method involves diluting the spent acid with water, until an oil or water insoluble layer forms, and then separating the two phases by decantation, etc. The obvious disadvantage in the process is that extensive refortification with $SO_3$ or fuming sulfuric acid is required in order to restore acid strength. The other method is the rather complicated carbonization technique which involves burning the spent acid to remove carbonaceous material and thus produce $SO_2$ and $SO_3$ gas, convert the $SO_2$ to $SO_3$, which, after separation and purification, is blended with water to make sulfuric acid again. For various reasons, the above-described methods are not entirely satisfactory, hence many workers are diligently seeking more effective and economical methods of solving the problem of purifying spent sulfuric acid.

Therefore, it is an object of the present invention to provide a novel method of purifying sulfuric acid.

Another object of the present invention is to provide a novel method for the removal of substantial amounts of non-polar and/or polar impurities from sulfuric acid by fractional crystallization.

Still another object of my invention is to provide for the purification of sulfuric acid by fractional crystallization through auto-refrigeration means.

A further object of this invention is to provide a method of purifying sulfuric acid through crystallization whereby lower temperatures of crystallization are permissible, and there is less of a tendency for impurities to adhere to the acid crystals.

Other objects and advantages of our invention will be apparent from the following description and explanation thereof.

One aspect of the present invention comprises crystallizing the contaminated sulfuric acid in a low viscosity organic liquid which is immiscible with sulfuric acid and does not solidify at crystallization temperatures and preferably but not necessarily is miscible with the impurities of the acid; separating the crystals of sulfuric acid from the liquid; optionally washing the crystals of sulfuric acid with a low viscosity organic liquid which is preferably but not necessarily miscible with the impurities of the acid and is immiscible with sulfuric acid; and melting the crystals of sulfuric acid and producing an acid product containing substantially less impurities than the contaminated acid.

Another aspect of the present invention comprises crystallizing the sulfuric acid solution by auto-refrigeration means, i. e., employing a volatilizable liquid as a means for cooling the acid solution to the crystallization temperature.

The present invention is concerned with purifying sulfuric acid solutions which contain polar and/or non-polar impurities. For the purpose of this specification and the appended claims, water will be treated as a separate impurity in addition to other impurities. The contaminated sulfuric acid solutions may contain any amount of sulfuric acid, water and other impurities and still be satisfactory for processing under the present invention; however, our invention has particular utility as a method for purifying strong acid solutions, namely, solutions containing at least about 80% total acidity expressed as $H_2SO_4$, preferably more than about 90% on the same basis. The individual impurity discussed above may comprise the sole contaminants in the acid solution, or the acid may contain at least two impurities and the concentration of each impurity may vary widely in relative proportion to each other.

The contaminated sulfuric acid solution may be subjected directly to crystallization temperatures. In such instance, the quality of crystals formed will depend upon the amount and type of impurities which are present in the original acid solution. The nature of the impurities will affect the concentration of acid in the acid crystals as well as the temperature at which such crystals will form. The type of impurity will also affect the quantity of sulfuric acid remaining in the liquid phase and the temperature at which the crystals form. The amount of impurities also influences the purity of the crystals, and the freezing point temperatures at which crystals are formed. Ordinarily, for any sulfuric acid solution, for given concentrations of impurities, it is found that crystals of sulfuric acid of a fixed purity will continue to form as the temperature is decreased, until a eutectic point is reached, whereat additional crystals of different composition form with some of the impurities still remaining in the liquid phase (this liquid may be soluble or miscible in the carrying or supporting media or may be totally immiscible). As the temperature of crystallization is continuously decreased and crystals of a constant purity are formed, there is a continuous decrease in the concentration of acid in the uncrystallized liquid, commonly known as mother liquor. In some cases, depending upon the nature of the impurities, there may be more than one eutectic point, consequently, it is desirable to practice our invention within the limits imposed by the eutectic characteristics of the acid solution or pre-treat the original contaminated acid solution so that crystallization is confined to sulfuric acid (water-free) leaving the impurities in the liquid phase within the temperature range at which the desired acid purity is obtained. The lowest acid concentration obtainable in the mother liquor will depend on the eutectic point of the spent acid solution.

Of the impurities usually found in sulfuric acid, water appears to have the greatest effect on the concentration of sulfuric acid in the mother liquor. This characteristic is to be expected, since sulfuric acid has a very strong affinity for water. In view of this factor, our invention can be practiced by regulating the water content of the contaminated or spent acid in order to control the loss of sulfuric acid in the mother liquor. However, it should not be understood from the above statement that impurities other than water do not exert an influence on the freezing point characteristics of the acid solution, because it is intended to show a practical method of obtaining high purity acid crystals. Therefore, it will be noted that the present invention is not limited to any range of water concentration in order to produce high purity acid crystals, because the amount of water in the contaminated acid can be controlled by treatment with an $SO_3$ containing material, e. g., sulfur trioxide and/or fuming sulfuric acid.

At crystallization temperatures, it is discovered that the polar and/or non-polar impurities remain substantially in the mother liquor. Usually, part of the impurities are sorbed on the surfaces of the acid crystals and to some extent occluded by the crystals. It was observed, in some instances, that there is a correlation between crystallization temperature and purity of acid crystals. As the temperature is lowered, the crystals become less pure, and this phenomenon is apparently caused by the impurities undergoing an increase in viscosity with lowering of temperature and hence readily sorbing on the surfaces of the acid crystals. To counteract this effect, it is proposed to crystallize the contaminated acid solution in the presence of an organic liquid which does not solidify at crystallization temperatures and will be preferably substantially less viscous than the impurities at corresponding temperatures. Furthermore, such an organic liquid should be chemically inert and substantially immiscible with sulfuric acid and preferably possesses the property of unfavorably influencing the sorption of impurities on the crystal surfaces. For our purposes, the use of relatively low viscosity, inert, immiscible organic compounds or mixtures thereof serve to space the impurities from the acid crystals or such a liquid tends to adversely influence the affinity of the impurities for the crystals. It is preferred that the low viscosity organic liquid should have little or no attraction for the sulfuric acid, such as an undesirably high solubility, otherwise a separation of the acid from the low viscosity liquid will need to be effected. The use of this organic liquid or solvent as a spacer during the crystallization step, makes possible the employment of lower temperatures of crystallization, which heretofore were not possible or practicable, because of the difficulty in separating crystals from liquor. Generally, the organic liquid used as a spacer in relation to the sulfuric acid in liquid form, on a volumetric ratio basis, is about 1 to about 100 parts of spacer per part of acid. The preferred procedure is to disperse the liquid acid in a continuous phase of organic liquid, in order to provide a condition in which a large amount of spacer is present relative to the liquid acid during the crystallization step. Accordingly, for such a procedure, it is preferred to employ about 10 to about 50 parts by volume of organic liquid per part of acid which is present in the crystallization zone.

The crystallization of contaminated acid is conducted at a temperature in the range of about 50° F. to about −100° F. The invention is particularly applicable for purifying sulfuric acid at low temperatures below about 0° F., for example, in the range of about −40° to 0° F. The selection of a crystallization temperature depends on the type and quantity of impurities present. The temperature selected will generally be that resulting in maximum crystal yield with minimum impurities. Lower temperatures generally favor larger yields of acid crystals, however, simultaneously there may be the adverse effect of increased mother liquor viscosity to lower the crystal purity at these lower temperatures. The presence of our organic liquid tends to overcome this effect. The optimum temperature range to be used will depend on the nature of the impurities and the desired extent of purification.

The separation of acid crystals from the mother liquor ordinarily presents difficult problems when low temperatures are employed for the crystallization. This difficulty is substantially overcome by means of this invention, which also provides an improvement over the technique of separation used for operations involving higher crystallization temperatures. It was found that in the case of mechanical separation of crystals from mother liquor, the better procedure is to employ centrifugal separation. Impurities present in the spent acid tend to adhere to the crystal surfaces, and centrifugal separation appears to effect better removal of these impurities from the surfaces of the crystals than some of the other mechanical methods. In accordance with the present invention, the separation of crystals from mother liquor can be made much easier by dispersing fine droplets of acid to be purified into the organic liquid which serves as the supporting medium. The temperature of the liquor may exist at the desired crystallization temperature, consequently, the droplets of acid are crystallized as small particles. The separation of crystals from the organic liquid is preferably conducted by centrifugal separation, and during the separation operation, the organic liquid serves to wash the impurities from the crystal surfaces. The separation of crystals from the supporting medium can be effected by other means such as, for example, decantation, filtration, etc., and then the crystals can be washed with a fresh organic liquid which can be more effective for the removal of impurities from the crystals.

After the crystals are separated from the uncrystallized liquid, they can be washed with a liquid solvent which is chemically inert with respect to sulfuric acid and preferably miscible with the impurities sorbed on the crystal surfaces and immiscible with the sulfuric acid; or if such a solvent is not available, a low viscosity liquid which is chemically inert and immiscible with the acid can be used. In the washing step, it is preferred to have turbulent conditions or agitation in order to promote the removal or desorption of impurities from the acid crystals. The washing operation can be repeated as frequently as it is desired, the only limitation being an economical consideration. Generally about 1 to about 100 parts by volume of wash liquid, preferably about 5 to about 25 parts by volume, per volume of solid acid (crystals) are employed in the washing operation.

Another important advantage in our invention is the feature of auto-refrigeration which eliminates exchangers and scraper coolers and allows proper crystal dispersion and size. Ordinarily, the technique of auto-refrigeration is accomplished by employing a liquid in the crystallization zone which can be vaporized by absorbing heat at relatively low temperature levels. Such a liquid facilitates temperature control by regulating the pressure in the crystallization zone. In practice, the pressure of the system can be superatmospheric, atmospheric or subatmospheric, depending upon the vapor pressure characteristics of the liquid. Usually, this pressure is about 5 to about 50 p. s. i. a. and the selection thereof depends primarily on the type of volatilizable liquid and the cooling requirements. Generally, a volatilizable liquid, preferably chemically inert and immiscible with $H_2SO_4$, is suitable. The liquids can be from a variety of classes including light aliphatic hydrocarbons having about 1 to 7 carbon atoms, halogenated aliphatic hydrocarbons, halocarbons, aliphatic ethers, etc. Specific examples of volatilizable liquids are the light paraffins, e. g., methane, ethane, propane, n-butane, isobutane, isopentane, n-pentane, etc., or mixtures of the foregoing. It will be noted that the volatilizable liquid can also serve as the low viscosity liquid which is discussed hereinabove as the spacer or supporting medium and also as the wash liquid. For example, propane and isobutane mixture is found to be an excellent and relatively cheap liquid for providing auto-refrigeration, serving as a spacer during crystallization of the acid and the liquid for turbulently contacting or washing the crystals.

To better understand the nature of our invention, specific illustrations of the various concepts will now be given by reference to the drawings which form a part of this specification.

Figure 2:
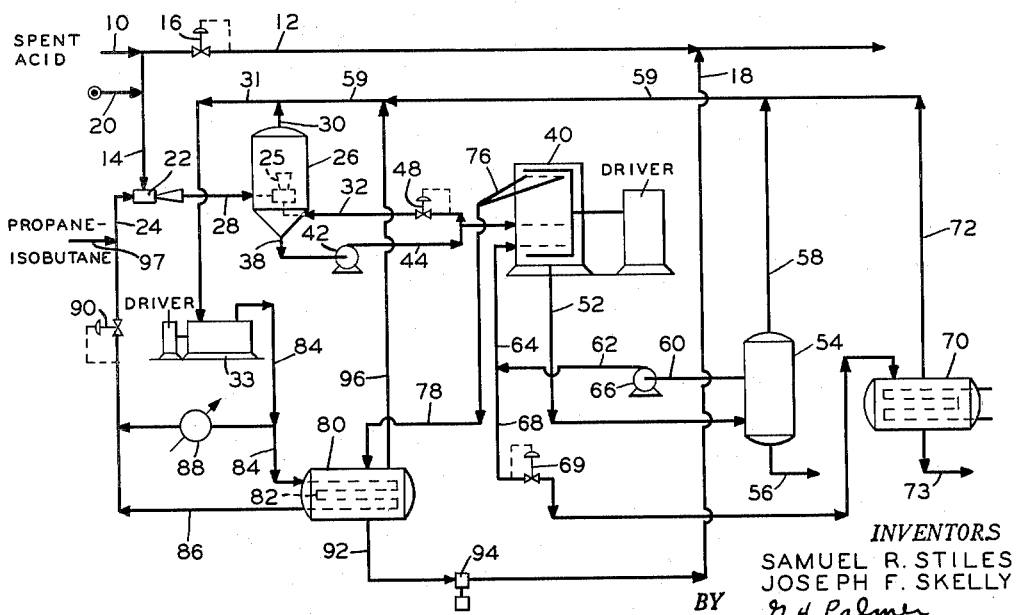

In the drawings:

Figure 1 is a correlation of freezing point temperatures with acid concentrations for (a) a system of water and acid and (b) a typical contaminated sulfuric acid from the alkylation process; and Figure 2 is a specific embodiment of a process for purifying contaminated sulfuric acid.

As a result of the alkylation reaction, the sulfuric acid becomes contaminated with mono-alkyl sulfate, di-alkyl sulfate and a relatively high molecular weight polymeric material. In addition, as a result of oxidation of the ester of $SO_2$, water and polymer, the water content of the acid solution increases. The efficacy of the acid as a catalyst is reduced significantly by the presence of the non-polar impurities, e. g., the di-alkyl sulfate and polymer and water and so it is necessary to decrease the concentration of these impurities in order to avoid any serious effect on the quality of the alkylate product. According to one theory of the isobutane-olefin reaction mechanism, the mono-alkyl sulfate appears to have no adverse effect on the alkylation reaction, but rather, it appears to be an intermediate material in the production of the alkylate. Water serves to dilute the acid solution possibly resulting from entrainment or solution with the hydrocarbon stream entering the alkylation reaction or from polymerization side reactions of the di-alkyl ester (sulfate), these by-products accumulate in the acid and retard its catalytic activity and lower the quality of the alkylate. In commercial practice, when these impurities increase to 10–12% the catalytic activity of the $H_2SO_4$ is considered too low, and is withdrawn from the reaction zone. If allowed to get below this value, the olefin polymerization reaction becomes excessive and the acid deteriorates rapidly.

The practice of our invention can best be illustrated by reference to the drawings, of which Fig. 2 represents a preferred embodiment.

In Figure 1, curve 4 illustrates the change in freezing point characteristics of a typical spent acid from an alkylation process as compared to a water-sulphuric acid system. Curve 5 represents the freezing point characteristics of a mixture of water and acid. In both cases, upon reaching the freezing temperature, crystals of pure or 100% sulphuric acid form. As crystals form, the concentration of acid in the mother liquor decreases, and in order to produce more acid crystals, the temperature is continually decreased. In the drawing, the acid concentration in the mother liquor is obtained by first noting the temperature of crystallization and then determining the acid concentration which corresponds to such a temperature by means of curves 4 and 5. It is to be noted that the bottom end of curve 5 represents the eutectic point of the system. In the case of sulphuric acid and water, the eutectic point is about —33° F. It is to be noted that the presence of mono- and di-ester material and the polymer has lowered the eutectic point as well as the concentration of acid which remains in the mother liquor. The latter feature is a distinct advantage in view that the loss of sulphuric acid in the mother liquor is reduced.

In Figure 2, spent acid from an alkylation process is received through a line 10. The spent acid has a titratible acidity of 94.1% by weight of sulfuric acid. It should be understood that the titratible acidity includes the free sulfuric acid as well as the ionizable hydrogen of the mono-ester. In this example, the spent acid has the following composition:

| Component: | Wt. percent |
|---|---|
| $H_2SO_4$ | 89 |
| Mono-ester ($C_4H_9$) $HSO_4$ | 8.1 |
| Water | 2.9 |

The spent acid is fed through line 10 and the stream is divided so that part passes through line 12 and the rest passes through line 14. The spent acid flowing through line 12 is controlled by means of a control valve 16. This spent acid is combined with regenerated or purified sulfuric acid by means of an acid product line 18. By means of this illustration, the regenerated acid has a titratible acidity of about 99% by weight of sulfuric acid. This regenerated acid is too highly concentrated for the temperature at which the alkylation reaction is conducted, because acid crystals would form. Consequently, to avoid such an occurrence, part of the spent acid is recycled with the purified acid in a quantity which will provide a final concentration of about 95 to 96% by weight of $H_2SO_4$.

The spent acid flowing through line 14 is then mixed with fresh acid containing sulfur trioxide via a supply line 20 to chemically combine with a part or substantially all of the free water. The presence of free water in the crystallization zone causes an undesirable quantity of sulfuric acid to remain uncrystallized in the mother liquor. This phenomenon occurs substantially less with respect to the non-polar impurities, hence, for all practical purposes, in some instances, combining the free water with the sulfur trioxide or highly concentrated sulfuric acid improves the yield of acid crystals substantially. When the heat liberated by the absorption of $SO_3$ becomes unduly high, the schematic flow in Figure 2 can be modified to provide the passage of the combined streams of fresh acid containing $SO_3$ and spent acid through a cooling means, e. g., a water cooler or exchanger (not shown).

The fortified spent acid in line 14 then passes to the low pressure nozzle of an eductor 22. A stream of propane and isobutane liquid is also fed to the high pressure nozzle of eductor 22 via a supply line 24. The propane-isobutane mixture, often hereinafter called propane, is used as a supporting media for the liquid and solidified acid, a cooling media to maintain the crystallization temperature by removing heat through vaporization, and as a spacing media to flush viscous impurity material from the acid crystals. The liquid propane-isobutane mixture is fed to the eductor where the fortified spent acid is introduced in the liquid phase and dispersed therein as small droplets. The volume ratio of hydrocarbons to fortified spent acid can be varied from about 2 to about 25:1. The dispersion of spent acid in propane-isobutane serves to facilitate the crystallization of sulfuric acid by providing a maximum surface area for the flow of heat from the droplets of acid, and the smaller the droplets the better the operation. The heat of fusion is removed by vaporizing part of the supporting medium. The dispersion or emulsion of spent acid in propane passes from the eductor 22 and enters another mixer 25 inside the crystallizer 26 via a line 28. The emulsified acid mixes with seed crystals in this mixer and the resulting mixture enters the crystallizer 26 which is at a temperature in the order of about —25° F. This temperature more usually may vary for paraffinic hydrocarbons in the range of about —40° to 0° F., preferably about —30° to —20° F. The spent acid, after fortification, is at a temperature of about 30° to 50° F., and vaporization of a portion of the liquid propane-isobutane mixer, which is at its boiling point, gives the final temperature mentioned above.

Inside the crystallizer, the emulsion of acid and propane is fed to the low pressure nozzle of the second eductor 25. Propane liquid containing acid crystals passes to the high pressure nozzle of 25 and mixes with this emulsion from line 28. The crystals of acid serve to initiate crystallization of the liquid acid and avoid supercooling effects. This practice is commonly known as "seeding" the solution. The crystallization temperature is obtained by controlling the pressure in the crystallizer at about 5 p. s. i. g. At this pressure, part of the liquid propane-isobutane vaporizes and passes overhead from the crystallizer through lines 30 and 31 and then to compressor 33 by which the pressure is regulated. The heat of vaporization is absorbed from the crystallizing acid and liquids present, thus causing the temperature to be maintained at the desired level.

The maintenance of temperature in the crystallizer can be accomplished by other means, viz., directly or indirectly. By the indirect means, cooling materials such as cooled liquids or gases can indirectly exchange heat through vertical or horizontal tubes or coils in the crystallizer. The direct means involve, for example, the passage of cooled fluids or solids through the crystallizer. Finely divided solids can serve to cool the contents of the crystallizer and also seed the solution.

A slurry of sulphuric acid crystals is withdrawn from the crystallizer by means of a bottom line 38. The slurry of acid crystals is conveyed to a basket-type centrifuge 40 by means of pump 42 and lines 44 and 46. A portion of the slurry of crystals is recycled to the high pressure nozzle of eductor 25 in the crystallizer as previously described via line 32. The rate of recycle is controlled by means of control valve 48 in line 32.

The basket-type centrifuge is a known type of apparatus. In this centrifuge, the acid crystals are retained on a spinning perforated drum. The uncrystallized liquid comprising sulphuric acid, water, mono- and di-esters, propane and polymer are forced through the cake or drum by centrifugal force and then withdrawn from the outer casing of the machine. A leveling rake rides on the crystal cake for distributing evenly the solids on the drum. When a predetermined cake thickness is reached, the rake arm closes the slurry inlet valve. A time cycle controller then introduces a wash liquid onto the cake for removal of any sorbed impurities on the crystals. The wash liquid flows for a predetermined period, followed by further spinning of the drum to insure more complete separation of liquids. Thereafter a knife rises and pares the cake of crystals from the spinning drum and diverts them to a suitable outlet. A thin layer of crystals does remain in the drum, and this can be further washed, before opening the charging valve to repeat the cycle.

Referring to the drawing, the uncrystallized liquid is discharged from the centrifuge through a bottom line 52. This uncrystallized liquid is passed into the bottom section of a separator 54. The liquid propane-isobutane in the total liquid containing some heavier hydrocarbon or polymer separates as a top or upper liquid phase in the separator, because propane and isobutane are not readily miscible with sulphuric acid-water mixtures and to only a small extent with the esters. The lower liquid layer comprises this heavier immiscible liquid of sulphuric acid, water and mono- and di-esters. The materials in the lower layer are withdrawn from the separator through a bottom line 56. In this particular example, it is not feasible to attempt recovering the acid from the bottom product in line 56. However, in those cases where the fortification with $SO_3$, etc. does not completely react with all the water, or no fortification step is used, it is contemplated within the scope of this invention to fortify the bottom product in line 56 of the separator to recover additional purified acid through re-crystallization. Any propane vapors in the separator resulting from heating, mechanical friction, etc., are removed through an overhead line 58, which connects with the propane vapor line 59.

The liquid propane in the separator 54 is withdrawn by means of line 60, and part of this propane stream is recycled to the centrifuge for washing the crystal cake by means of lines 62 and 64. The propane is conveyed by means of pump 66. The washing operation should be conducted at a temperature sufficiently low to avoid melting the crystals. This will be determined by the quality of the crystals and the respective crystallization temperature. In this example, washing is conducted by the continuous passage of propane through the cake of crystals of the same composition and temperature as that in the crystallizer. When using a batchwise process, the crystals can be washed as many as 10 times or higher with equal parts of low viscosity liquid. The liquid propane which is not used for washing is passed through a line 68 containing a regulating valve 69 to an evaporator 70 (or other fractionation equipment) when any impurities such as esters and polymer are separated from the propane. Propane vapors leave the evaporator 70 via a vapor line 72 and pass through line 59 before entering the propane compressor 33. The liquid esters and polymer leaves the evaporator by line 73. This separation of esters and polymer may also be accomplished by returning this stream from line 68 to the alkylation plant.

The washed crystals are discharged from the centrifuge by scraper 76, which in turn is connected to a line 78. The line 78 is connected to a melting vessel 80 in which is disposed a heating coil 82 for melting the acid crystals through indirect exchange of heat. This is accomplished by passing compressed propane vapors from the compressor 33 through a line 84 which is connected to the coil, and condensing the propane vapors by passing heat indirectly to the acid crystals. The propane as a liquid leaves the coil 82 through a line 86, passes through a line 24 which is connected to the eductor 22 previously explained. Additional propane vapors not condensed by the acid melter 80 are condensed by water cooled condenser 88. Valve 90 controls the flow of liquid returning to the eductor 22. The flow of the propane through melter 80 and water cooled condenser 88 will distribute itself automatically.

The liquid acid present in melting vessel 80 is withdrawn by means of a bottom line 92 and it is conveyed to the alkylation system (not shown) by means of pump 94. Any vaporized propane-isobutane which is present with the acid in the melting vessel is discharged through an overhead line 96, which in turn is connected to the propane vapor line 59. Any propane-isobutane remaining as a liquid is also returned to the alkylation reactor. Propane-isobutane needed to replace that lost or returned to the alkylation plant and to hold the desired ratio of propane and isobutane in the system is supplied via line 97 into line 24.

In order to further illustrate the present invention, experimental data is given below. In the examples presented below, filtration was accomplished by creating a vacuum to assist in the passage of uncrystallized liquid through a porous member. For each example, Numbers 1–4, inclusive, the cake of crystals on the porous member was washed with about 30–40 volumes of washing agent per volume of acid solids until little or no evidence of esters or polymers was noticeable in the effluent wash liquid.

It is noted from the data that there is an improvement in the acid crystal purity by reason that the titratable acidity increased over the value determined for the original spent acid. Examples 1–5, inclusive, illustrate that the use of low temperatures do effect a purification of sulfuric acid when using propane as the low viscosity liquid for the crystallization medium and wash liquid. Further, as the temperature of crystallization is decreased, the yield of crystals increases substantially, whereas the purity of crystals decreases slightly as is evident from the titratable acidity. The use of propane as a spacer material made possible the employment of low crystallization temperatures at which high crystal yields are possible, without any great decrease in crystal purity. Furthermore, by comparison with Example 5, it is to be noted that a much lower yield of crystals are obtained when no spacer is used, and the greater purity of crystal in Example 5 can be attributed to the use of centrifugal separation for recovery of the acid crystals.

Examples 1–4, inclusive, involved an aged sample of sulphuric acid, thus indicating that our process is feasible for spent acids which have been stored. As a rule, these acids are more difficult to purify because the impurities Table 1

| Example No. | 1 | 2 | 3 | 4 | 5 | 6 | 5 and 6 | 7 |
|---|---|---|---|---|---|---|---|---|
| Acid Sample | A | A | A | A | A | B | | C. |
| Method of Separation | Filtration | Filtration | Filtration | Filtration | Centrifugal | Centrifugal | | Centrifugal. |
| Crystallization Temp., °F | 0 | −10 | −20 | −30 | −30 | 20[3] | | [3]−30. |
| Crystallizing Medium[1] | Propane | Propane | Propane | Propane | none | none | | None. |
| Washing Agent[1] | do | do | do | do | do | do | | Do. |
| Spent Acid Titratable Acidity, Percent | 94.1 | 94.1 | 94.1 | 94.1 | 94.4 | 90+SO$_3$=97 | | 94+SO$_3$=97 |
| Acid Crystals Titratable Acidity, Percent | 95.9 | 95.5 | 95.1 | 95.0 | 98.1 | 97.9 | | 98.0. |
| Mother Liquor Titratable Acidity, Percent | 93.2 | 91.5 | 90.2 | 89.6 | 90.4 | 93.0 | | 87.8. |
| Yields:[2] | | | | | | | | |
| Percent Liquid | 50 | 33 | 22 | 13 | 30.0 | 13.4 | 3.0 | 5.0. |
| Percent Crystals | 50 | 67 | 78 | 87 | 70.0 | 86.4 | 97.0 | 95.0. |

(A) Spent acid from commercial alkylation unit having the following analysis:

Percent by weight
$H_2SO_4$ ------------------------------------------------------------------------- 98.0
$(C_4H_9) HSO_4$ ---------------------------------------------------------------- 8.1
$H_2O$ ---------------------------------------------------------------------------- 2.9

(B) Filtrate from experiment #5 fortified by 20% $SO_3$, 80% $H_2SO_4$ to remove all water.
(C) Original charge acid A fortified by 20% $SO_3$, 80% $H_2SO_4$ to remove all water.
[1] Where propane is mentioned, it is a mixture of propane and isobutane.
[2] Yields were determined on an output basis.
[3] Initial crystallation temperature was 50° F.

are more readily retained by the crystals, probably due to viscosity characteristics.

Example 5 serves to indicate the advantage of using centrifugal means for separating the acid crystals from the mother liquor. In this example, neither a crystallization medium nor a wash liquid were employed, and yet the results clearly show the improvement in acid purification by centrifugal separation alone. In practice centrifuging and supporting fluid would be used.

Example 6 is concerned with the fortification of the mother liquor of Example 5 to recover additional purified acid. The data shows that the recovery of acid increased, and that the additionally purified acid is of high quality.

Example 7 involved the fortification of spent acid prior to the first crystallization. The results indicate that a substantial yield of crystals is obtained by eliminating the free water in the spent acid through combination with $SO_3$. Furthermore, the crystals obtained are substantially purer than the original spent acid.

The above data clearly demonstrates the advantage of using a spacer material as a crystallization medium for the spent acid. The yield of purified acid is greatly increased, and when employing this technique with centrifugal separation, it is to be expected that a high level of crystals of such high purity will be obtained.

Having thus provided a description of our invention along with specific examples thereof, it should be understood that no undue limitations or restrictions are to be imposed by reason thereof, but that the scope of the invention is defined by the appended claims.

We claim:

1. A process of purifying sulfuric acid contaminated with at least one impurity selected from polar and nonpolar impurities which comprises supplying from a source other than said contaminated acid a low viscosity organic liquid which is chemically inert and immiscible with sulfuric acid to a crystallization zone to form a liquid medium therein, supplying the contaminated acid to the crsytallization zone, dispersing contaminated acid into the liquid medium in the crystallization zone which is maintained at a temperature sufficient to crystallize sulfuric acid, separating the acid crystals thus formed from the remaining liquid and melting the acid crystals to produce an acid of improved purity.

2. The process of claim 1 wherein the organic liquid is a light paraffinic hydrocarbon.

3. The process of claim 1 wherein the crystallization temperature is maintainetd at −100° to about 50° F.

4. A process of purifying sulfuric acid contaminated with at least one impuritiy selected from polar and nonpolar impurities which comprises supplying from a source other than said acid a low viscosity organic liquid which is chemically inert and immiscible with sulfuric acid to a crystallization zone to form a liquid medium therein, supplying the contaminated acid to the crystallization zone, dispersing contaminated acid into the liquid medium in the crystallization zone which is maintained at a temperature sufficient to crystallize sulfuric acid, the relative rates of organic liquid and contaminated acid to said crystallization zone are about 1 to 100 parts by volume of organic liquid to one part by volume of acid, separating the acid crystals thus formed from the remaining liquid and melting the acid crystals to produce an acid of improved purity.

5. The process of claim 4 wherein the organic liquid is a light paraffinic hydrocarbon.

6. The process of purifying sulfuric acid contaminated with at least one impuritiy selected from polar and nonpolar impurities which comprises supplying from a source other than said acid a volatilizable low viscosity organic liquid which is chemically inert and immiscible with sulfuric acid to a crystallization zone to form a liquid medium therein, supplying the contaminated acid to the crystallization zone, dispersing contaminated acid into the liquid medium in the crystallization zone, maintaining a temperature in the crystallization zone sufficient to crystallize sulfuric acid by volatilizing a portion of said organic liquid, separating the acid crystals thus formed from the remaining liquid, and melting the acid crystals to produce an acid of improved purity.

7. The process of purifying sulfuric acid contaminated with at least one impurity selected from polar and nonpolar impurities which comprises supplying from a source other than said acid a volatizable low viscosity organic liquid which is chemically inert and immiscible with sulfuric acid to a crystallization zone to form a liquid medium therein, supplying the contaminated acid to the crystallization zone, dispersing contaminated acid into the liquid medium in the crystallization zone, maintaining a temperature sufficient to crystallize sulfuric acid in the crystallization zone by volatilizing a portion of the volatilizable organic liquid, separating the acid crystals thus formed from the remaining liquid, washing the acid crystals with a low viscosity organic liquid which is chemically inert and immiscible with the sulfuric acid, and melting the washed crystals to produce an acid of improved purity.

8. The process of purifying sulfuric acid contaminated with at least one impurity selected from polar and nonpolar impurities and also including water which comprises treating the contaminated acid with a sulfur trioxide containing material to react substantially all of the water therewith, supplying from a source other than the treated acid a low viscosity organic liquid which is chemically inert and immiscible with sulfuric acid to a crystallization zone to form a liquid medium therein, supplying the treated acid to the crystallization zone, dispersing treated acid into the liquid medium in the crystallization zone which is maintained at a temperature sufficient to crystallize sulfuric acid, separating the acid crystals thus formed from the remaining liquid, and melting the acid crystals to produce an acid of improved purity.

9. The process of purifying sulfuric acid contaminated with at least one impuritiy selected from polar and non-polar impurities which comprises supplying from a source other than said acid a low viscosity organic liquid which is immiscible and chemically inert with said acid to a crystallization zone to form a liquid medium therein, supplying the contaminated acid to the crystallization zone, dispersing contaminated acid into the liquid medium in the crystallization zone which is maintained at a temperature sufficient to crystallize sulfuric acid, separating the acid crystals thus formed from the remaining liquid by means of centrifugal action, and melting the acid crystals to produce an acid of improved purity.

10. The process of purifying sulfuric acid contaminated with at least one impurity selected from polar and non-polar impurities which comprises supplying from a source other than said acid a low viscosity organic liquid which is chemically inert and immiscible with sulfuric acid to a crystallization zone to form a liquid medium therein, supplying the contaminated acid to the crystallization zone, dispersing contaminated acid as fine droplets into the liquid medium in the crystallization zone which is maintained at a temperature sufficient to crystallize sulfuric acid, the relative rates of organic liquid and contaminated acid supplied to said crystallization zone are about 1 to 100 parts by volume of organic liquid per part by volume of acid, separating the acid crystals thus formed from the remaining liquid, washing the crystals with a low viscosity and chemically inert organic liquid which is immiscible with sulfuric acid, and melting the washed crystals to produce an acid of improved purity.

11. The process of purifying sulfuric acid contaminated with at least one impurity selected from polar and non-polar impurities which comprises supplying from a source other than said acid a light paraffinic hydrocarbon which is immiscible and chemically inert with sulfuric acid to a crystallization zone to form a liquid medium therein, supplying the contaminated acid to the crystallization zone, dispersing contaminated acid as fine droplets into the liquid medium in the crystallization zone which is maintained at a temperature sufficient to crystallize sulfuric acid, the relative rates of paraffinic hydrocarbon and contaminated acid supplied to the crystallization zone are about 1 to 100 parts by volume of hydrocarbon per part by volume of contaminated acid, separating the acid crystals thus formed from the remaining liquid by centrifugal action, and melting the acid crystals to produce an acid of improved purity.

12. A process for purifying sulfuric acid contaminated with at least one impurity selected from polar and non-polar impurities which comprises supplying from a source other than said acid a light paraffinic hydrocarbon which is chemically inert and immiscible with sulfuric acid to a crystallization zone to form a liquid medium therein, supplying the contaminated acid to the crystallization zone, dispersing contaminated acid into the liquid medium in the crystallization zone which is maintained at a temperature of about $-100°$ to about $50°$ F. and thus crystallizing sulfuric acid, separating the acid crystals thus formed from the remaining liquid and melting the acid crystals to produce an acid of improved purity.

13. The process of claim 12 wherein the temperature in the crystallization zone is maintained at about $-40°$ to $0°$ F.

14. A process for purifying sulfuric acid contaminated with at least one impurity selected from polar and non-polar impurities and also including water which comprises treating the contaminated acid with sulfur trioxide containing material to react substantially all of the water therewith, supplying from a source other than said treated acid a volatilizable light paraffinic hydrocarbon which is chemically inert and immiscible with sulfuric acid to a crystallization zone to form a liquid medium therein, supplying the treated acid to the crystallization zone, dispersing the treated acid as fine droplets into the liquid medium in the crystallization zone which is maintained at a temperature of about $-40°$ to $°0$ F. and thereby producing sulfuric acid crystals, the relative rates of paraffinic hydrocarbon and treated acid supplied to the crystallization zone are about 1 to about 100 parts by volume of paraffinic hydrocarbon per part by volume of treated acid, volatilizing a portion of the paraffinic hydrocarbon in the crystallization zone in a quantity sufficient to maintain the aforesaid temperature therein, separating the acid crystals thus formed from the remaining liquid and melting the acid crystals to produce an acid of improved purity.

15. The process of claim 14 wherein the light paraffinic hydrocarbon is propane.

16. The process of claim 14 wherein the light paraffinic hydrocarbon is a mixture of propane and a $C_4$ paraffin.

References Cited in the file of this patent

UNITED STATES PATENTS

| | | |
|---|---|---|
| 2,287,732 | Frey et al. | June 23, 1942 |
| 2,593,128 | Felter | Apr. 15, 1952 |

FOREIGN PATENTS

| | | |
|---|---|---|
| 4,430 | Great Britain | Mar. 24, 1887 |
| 96 | Great Britain | Jan. 8, 1883 |